United States Patent [19]

Aono et al.

[11] Patent Number: 5,056,154

[45] Date of Patent: Oct. 8, 1991

[54] TEXT IMAGE DATA COMPRESSION SYSTEM

[75] Inventors: Tomoko Aono, Tenri; Hiroyuki Katata, Nara; Yoji Noguchi, Ikoma, all of Japan

[73] Assignee: Sharp Kabushiki Kaisha, Osaka, Japan

[21] Appl. No.: 431,828

[22] Filed: Nov. 6, 1989

[30] Foreign Application Priority Data

Nov. 7, 1988 [JP] Japan ............................ 63-281129
Apr. 26, 1989 [JP] Japan ............................ 1-106328
Apr. 28, 1989 [JP] Japan ............................ 1-109934

[51] Int. Cl.⁵ ...................... G06K 9/00; H04N 7/12
[52] U.S. Cl. ................................. 382/56; 358/429;
358/261.1; 358/261.3
[58] Field of Search .............. 382/56; 358/427, 429, 358/261.1, 261.3

[56] References Cited

U.S. PATENT DOCUMENTS

| | | | |
|---|---|---|---|
| 4,110,795 | 8/1978 | Spencer | 358/429 |
| 4,124,870 | 11/1978 | Schatz et al. | 358/429 |
| 4,652,935 | 3/1987 | Endoh et al. | 358/261.3 |
| 4,788,598 | 11/1988 | Ochi et al. | 382/56 |
| 4,907,286 | 3/1990 | Yamada | 382/51 |

OTHER PUBLICATIONS

Proceedings of the IEEE, vol. 69, No. 3, Mar. 1981, pp. 349-384, "Image Data Compression: A Review".
Data Compression by A. J. Johnson, pp. 336-353.
IRE Transactions on Information Theory, Mar. 1960, pp. 7-12, "Quantizing for Minimum Distortion", by Joel Max.

*Primary Examiner*—Leo H. Boudreau
*Assistant Examiner*—Rohini Khanna
*Attorney, Agent, or Firm*—Sandler, Greenblum & Bernstein

[57] ABSTRACT

A text image data compression system for compressing image data having pixels each being expressed by N bit data which varies from a maximum value to a minimum value, includes a circuit for replacing the maximum value N bit data with a first symbol "3" followed by N−1 bit common data "*" and the minimum value N bit data with a second symbol "2" followed by N−1 bit common data "*". Also provided is a circuit for making a symbol alignment such that the most significant symbols are collected and are aligned from the first row to the bottom row, the second significant symbols are collected and are aligned from the first row to the bottom row, kth significant symbols are collected and are aligned from the first row to the bottom row, in which k is between three and N−1, and the least significant symbols are collected and are aligned from the first row to the bottom row, and that all of said common symbols "*" are removed; and a circuit for detecting run lengths in the symbol alignment to produce run lengths of four different symbols "3", "2", "1" and "0".

8 Claims, 15 Drawing Sheets

Fig. 8
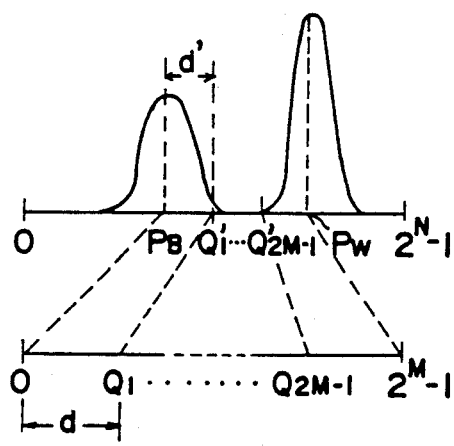
Fig. 10
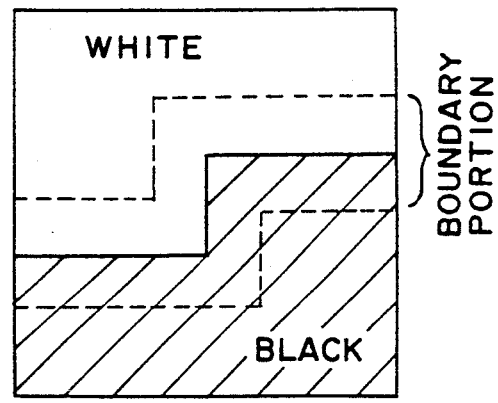
Fig. 11a
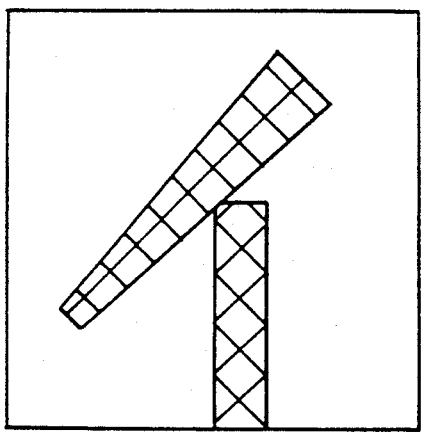
Fig. 11b
| 10 | 13 | 12 | 13 | 13 | 12 | 13 | 13 |
| 10 | 12 | 13 | 13 | 5  | 2  | 13 | 13 |
| 12 | 13 | 12 | 5  | 2  | 5  | 12 | 13 |
| 13 | 13 | 5  | 2  | 4  | 13 | 13 | 13 |
| 13 | 8  | 3  | 4  | 3  | 13 | 13 | 13 |
| 13 | 3  | 8  | 13 | 3  | 13 | 10 | 10 |
| 13 | 13 | 13 | 12 | 2  | 12 | 10 | 10 |
| 13 | 13 | 13 | 13 | 3  | 13 | 12 | 13 |
Fig. 12
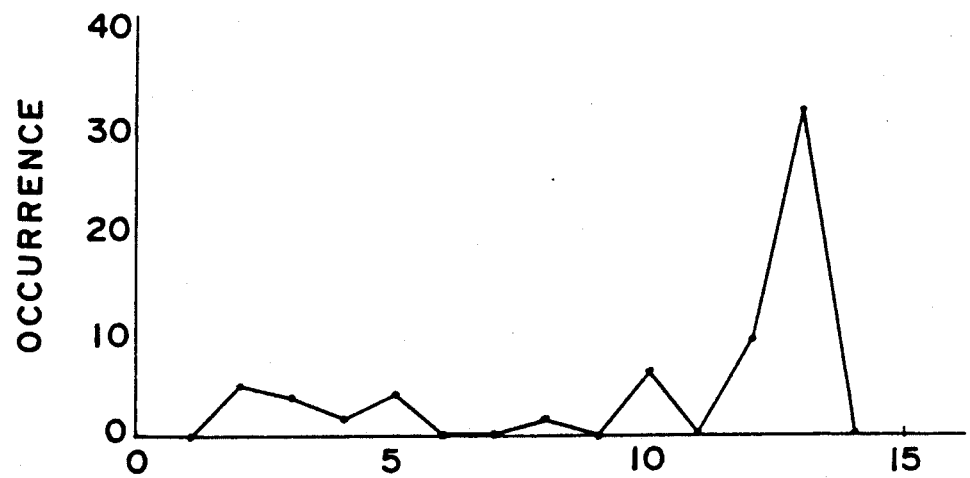

```
10 15 15 15 15 15 15 15
10 15 15 15  5  0 15 15
15 15 15  5  0  5 15 15
15 15  5  0  5 15 15 15
15 10  0  5  0 15 15 15
15  0 10 15  0 15 10 10
15 15 15 15  0 15 10 10
15 15 15 15  0 15 15 15
```

```
15 15 15 15 15 15 15 15
15 15 15 15  0  0 15 15
15 15 15  0  0  0 15 15
15 15  0  0  0 15 15 15
15 15  0  0  0 15 15 15
15  0 15 15  0 15 15 15
15 15 15 15  0 15 15 15
15 15 15 15  0 15 15 15
```

```
         15  0  0 15
         15  0     0 15
      15  0        0 15
      15  0        0 15
   15  0 15 15  0 15
            15  0 15
            15  0 15
```

```
15 15 15 15  15 15 15 15
15 15 15 15   5  0 15 15
15 15 15  5   0  5 15 15
15 15  5  0   5 15 15 15
15 10  0  5   0 15 15 15
15  0 10 15   0 15 15 15
15 15 15 15   0 15 15 15
15 15 15 15   0 15 15 15
```

```
            15 15
         15  5  0
      15  5  0  5
   15  5  0  5 15
   10  0  5  0
    0 10 15
   15 15
```

```
15 15 15 15 15 15 15 15
15 15 15 15  5  0 15 15
15 15 15  5  0  5 15 15
15 15  5  0  5 15 15 15
15 10  0  5  0 15 15 15
15  0 10 15  0 15 15 15
15 15 15 15  0 15 15 15
15 15 15 15  0 15 15 15
```

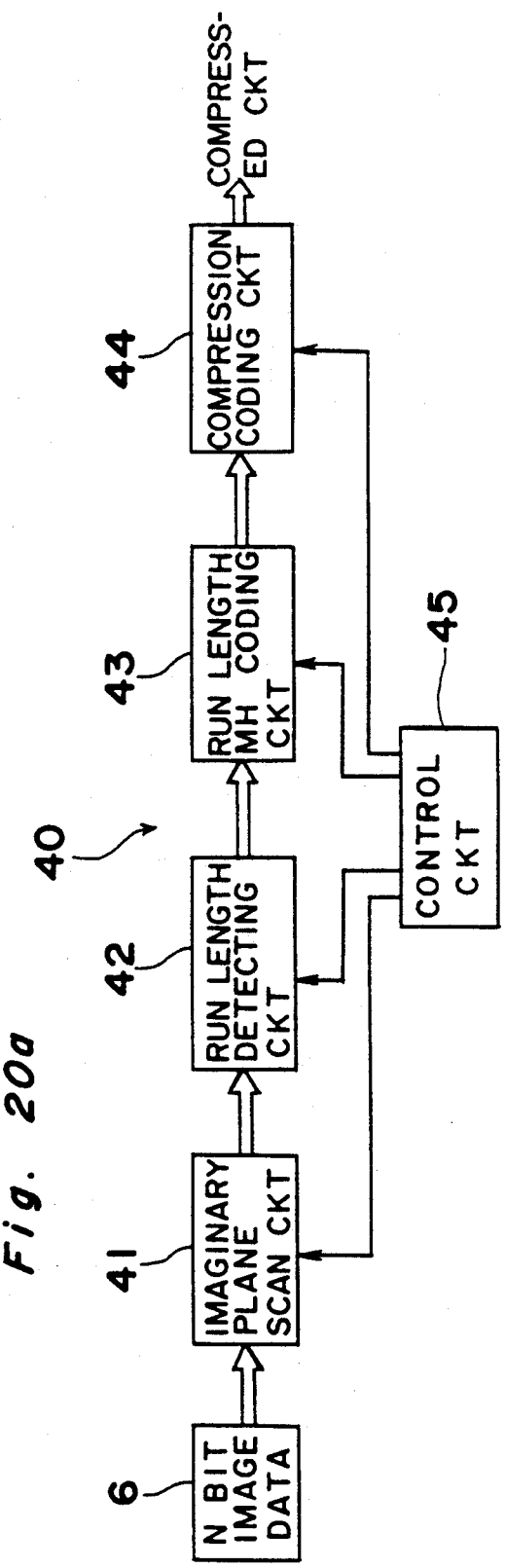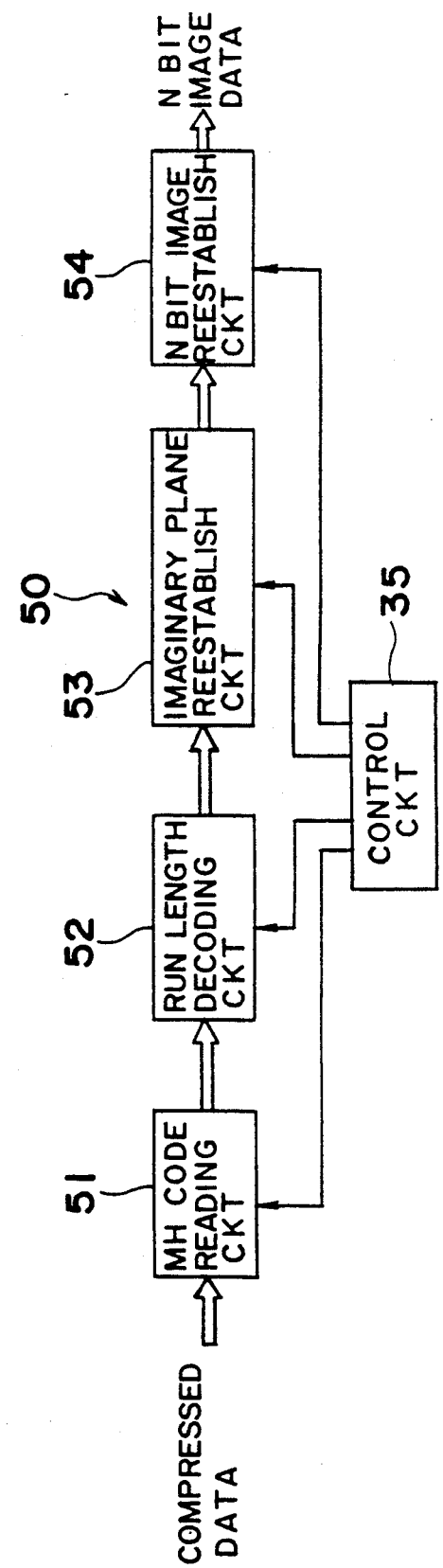

TEXT IMAGE DATA COMPRESSION SYSTEM

BACKGROUND OF THE INVENTION

1. Field of the Invention

The present invention relates to a digital image processing system and, more particularly, to a data compression system employing a coding system of grey level text image data, in consideration of text images and combined resultant images.

2. Background Description

According to the background art, in order to form grey level text images such as character images in a word processor, the grey level character images are formed by the method of quantization in which the quantization level is determined arbitrarily, as in other digital image formation.

Generally, a grey level image is formed by a plurality of pixels aligned in two orthogonal directions, each pixel having a white, black or intermediate gray valve, expressed by n bits of data. For example, white is expressed by all ones (111 . . . 1); black is expressed by all zeros (000 . . . 0); and intermediate gray is expressed by a combination of ones and zeros In FIG. 1, an example of a 4×5 pixel image is shown in which the first pixel from the left in the first row is white (11 . . . 1). The second pixel in the first row is gray (11 . . . 0), the third pixel is black (00 . . . 0), and the fourth pixel is gray (10 . . . 1). Such an image formed by binary data with each pixel expressed by N bits is generally referred to as an N-bit plane image.

When the data for the grey level text image is to be compressed by the coding method, a bit plane dividing method is first effected to pretreat the image data to produce a series of binary data. Then, a data compression method, such as run length coding is effected.

The bit plane dividing method is diagrammatically shown in FIG. 1. Since each pixel contains N bits, N sheets of bit planes are prepared and are numbered from first to Nth. The Nth bit plane is defined by the collection of the most significant bit from each pixel, and the collected bits are aligned at corresponding pixel positions in the Nth bit plane. Similarly, the (N−1)th bit plane is defined by the collection of the second most significant bit from each pixel, and so on. The first bit plane is defined by the collection of the least significant bit from each pixel.

To store the image data, first, the binary data on the Nth bit plane are serially read out from the top row to the bottom row, and then the data on the (N−1)th bit plane are serially read out, and so on, until the first bit plane, and the readout data are serially stored in a suitable storing means. According to this method, in total, 4×5×N bits will be stored in the storing means.

To compress the data to be stored, run length coding, e.g., modified Huffman coding or modified read coding (a kind of two dimensional coding), is used. For example, if the run length coding is used, a long run of "1" or "0" data can be compressed such that, instead of repeating the same data "1" or "0", a code indicating the data length and a code indicating the type of repeated data is inserted.

The conventional compression coding system as described above is formed in the light of the fact that the data representing the background area, usually white area, occupies a great percentage of the total data. However, with grey level text image, the dynamic range of the intensity level (between white and black) may not be fully utilized, as shown in FIGS. 2a and 2b, in which FIG. 2a shows a case wherein the dynamic range width is not fully utilized, and FIG. 2b shows a case wherein the dynamic range is shifted. Thus, in the prior art compression coding system, since the distribution pattern differs with respect to different original images, the compression coding can not be carried out with the use of a fixed quantization level, as further explained below with an example of a P−level text image.

The P-level text image includes pixels representing white background portions, black text image portions depicted on the white background, and boundary portions between the background portion and black text image portion. Quantization is effected such that the white background portions are assigned with a maximum level (P−1), the black text image portions are assigned with a minimum level (0), and the boundary portions are assigned with intermediate levels (1 through P−2). Statistically, the pixels with the maximum level (P−1), representing the white area, occupy the greatest percentage, such as greater than 90%. The next greatest percentage would be about several percent occupied by the pixels with the minimum level (0), representing the black area. The remaining pixels, with the intermediate levels (1 through P−2) for the boundary areas (edge portions), typically occupy a very small percentage. The percentages given in the above example are based on a 3-bit image including 512×512 pixels.

According to the conventional coding system employing the bit plane dividing method described above, the bit planes carrying binary images have strong correlation. For example, in the case of an N-bit image, the binary data at the pixel position representing white would be "1" for all the bit planes. Thus, the bit images on the bit planes would be very similar to each other. When each bit plane is coded, the same or a similar coded pattern would be repeated, resulting in high redundancy. Thus, according to the prior art coding system, since similar binary images on a plurality of bit planes (i.e., with strong correlation) are coded, the data compression can not be carried out with a high compression rate.

SUMMARY OF THE INVENTION

The present invention has been developed with a view to substantially solving the above described disadvantages, and has for its essential object to provide an improved image data coding system with a high compression rate.

In accomplishing these and other objects, a text image data compression system is disclosed for compressing image data including characters images disposed in a plain background image. Means are provided for producing a grey level image data for a plurality of pixels aligned in two orthogonal directions, each pixel being expressed by n bit data which varies from a maximum value to a minimum value in which the pixels with maximum value represent background, the pixels with minimum value represent characters, and the pixels with intermediate value represent boundary portions between the background and characters. Further means are provided for replacing the maximum value N bit data with a first symbol ("3") followed by N−1 bit common data ("*") and replacing the minimum value N bit data with a second symbol ("2") followed by N−1 bit common data ("*"). Thus, background portions are expressed by N bit symbols ("3** . . . *"), composed of combination of the first symbol ("3") and a plurality of the common symbols ("*"), character portions are expressed by N bit symbols ("2** . . . *"), composed of the second symbol ("2") and a plurality of the common symbols ("*"), and intermediate grey level portions are expressed by N bit symbols composed of binary 1's and binary 0's. Means are provided for making a symbol alignment such that the most significant symbols are collected and are aligned from the first row to the bottom row, the second significant symbols are collected and are aligned from the first row to the bottom row, the Kth significant symbols are collected and are aligned from the first row to the bottom row, in which K is between three and N−1, and the least significant symbols are collected and are aligned from the first row to the bottom row, and for making the symbol alignment such that all of the common symbols ("*") are removed. In addition, means are provided detecting run lengths in the symbol alignment to produce run lengths of four different symbols ("3", "2", "1", "0").

BRIEF DESCRIPTION OF THE DRAWINGS

These and other objects and features of the present invention will become apparent from the following description taken in conjunction with preferred embodiments thereof with reference to the accompanying drawings, throughout which like parts ar designated by like reference numerals, and in which:

FIG. 8 is a graph showing a histogram and a relationship between the grey levels before and after the reduction;

FIG. 10 is a diagram showing a boundary portion between a white background and a black character portion;

FIG. 11a is an image formed on a screen;

FIG. 11b is a 4 bit image data pattern corresponding to the image shown in FIG. 11a;

FIG. 12 is a histogram of the binary image shown in FIG. 11b;

FIG. 13a is a graph showing a relationship between the grey levels before and after the reduction;

FIG. 13b is a reduced bit image data pattern effected by the reduced grey level shown in FIG. 13a;

FIG. 14 is a bi-level image data pattern obtained from the data of FIG. 13b;

FIG. 15 is a bi-level image data pattern obtained by horizontally scanning the image data pattern of FIG. 14 to obtain vertically extending boundary portions;

FIG. 20a is a block diagram of a run length coding system according to a preferred embodiment of the present invention;

FIG. 20b is a block diagram of a run length decoding system according to a preferred embodiment of the present invention;

FIGS. 26a and 26b are data structure diagrams, in which FIG. 26a shows a structure of an MH coding table corresponding to runs for symbols "2" and "3" included in the Nth bit plane, and FIG. 26b shows a structure of an MH coding table corresponding to runs for symbols other than "2" and "3".

DETAILED DESCRIPTION OF THE PREFERRED EMBODIMENTS

The description hereinbelow is first directed to a system for reducing the number of grey levels, and then, a system for compressing character image data will be described.

1. System for Reducing the Number of Grey Levels

Figure 1:
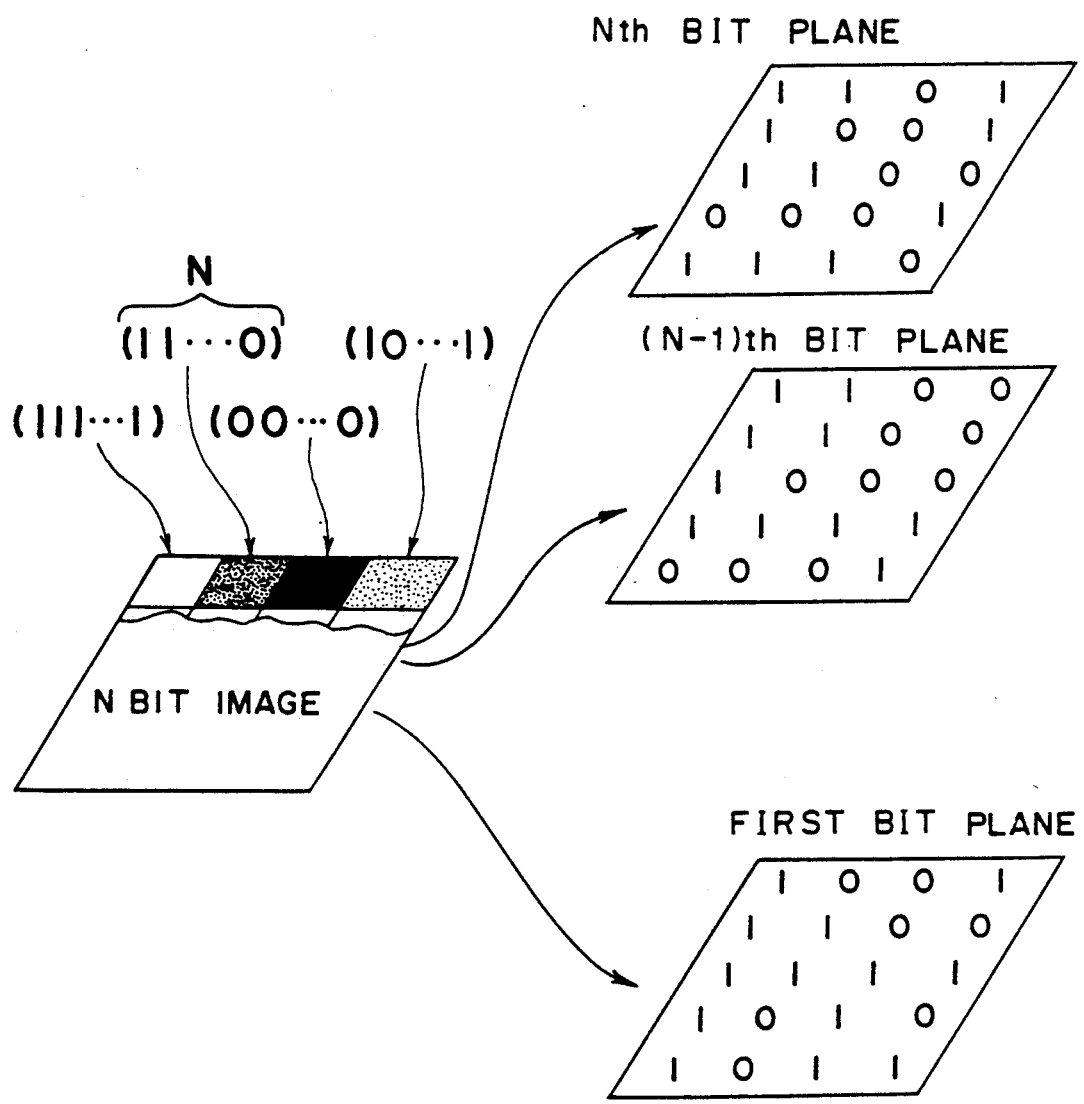
FIG. 1 is a diagrammatic view of a bit plane dividing method according to the prior art.
Figure 2A:
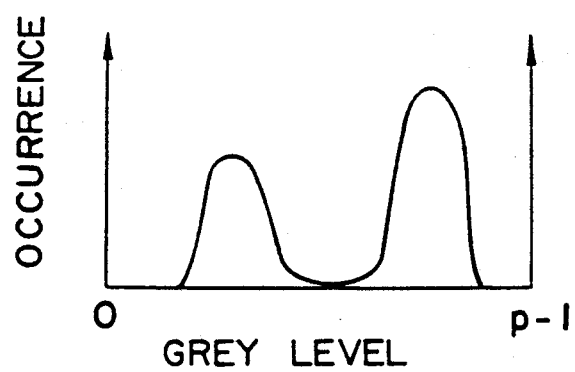
FIGS. 2a and 2b are graphs showing histograms in which the abscissa and ordinate represent pixel values and the number of occurrences, respectively.
Figure 2B:
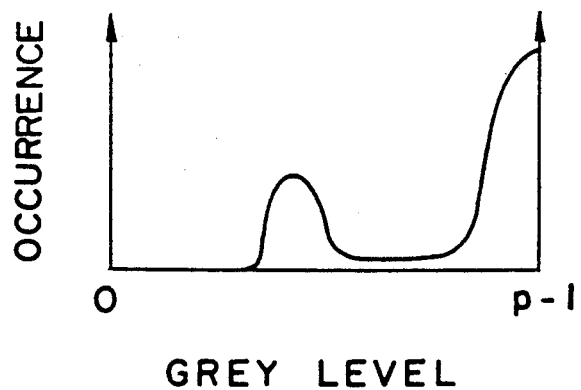
Figure 3:
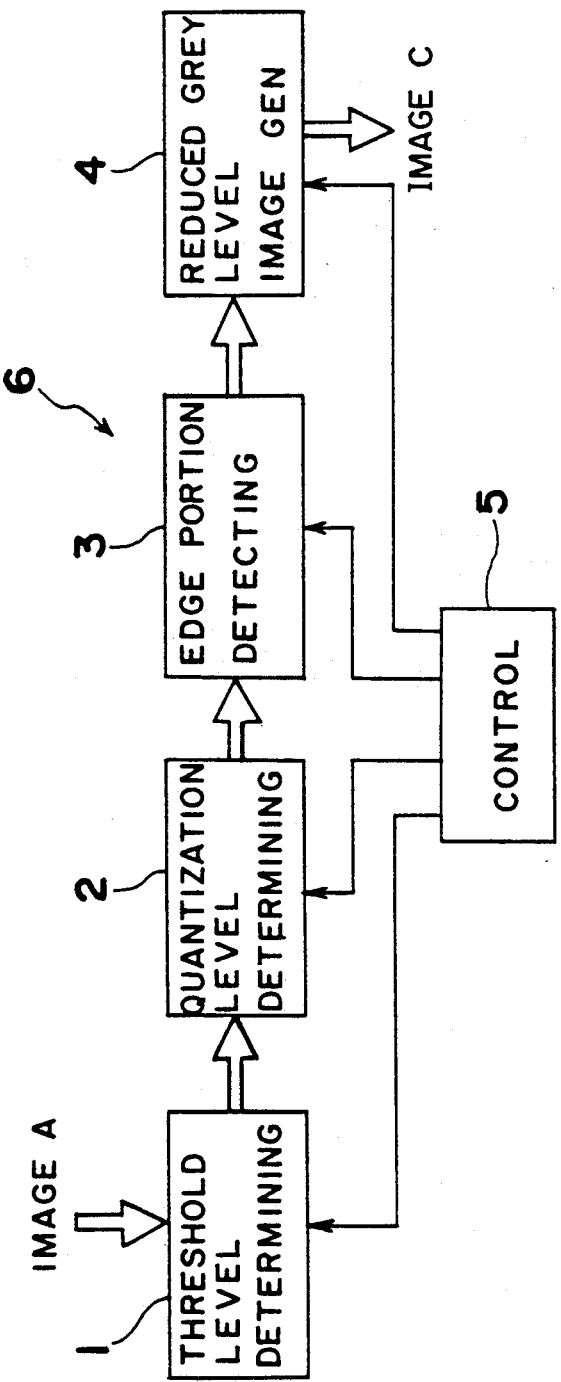
FIG. 3 is a block diagram of a grey level reduction system, according to one preferred embodiment of the present invention.

Referring to FIG. 3, a grey level reduction system 6 is shown which comprises a threshold level determining block 1, quantization level determining block 2, an edge portion detecting block 3, a reduced grey level image generator block 4 and a control 5 for controlling blocks 1–4. All these blocks are preferably carried out by the computer processing operation, such as shown in the flow chart of FIG. 4. According to this embodiment, the input image A applied to block 1 is defined by original grey level image data, having q grey levels formed in a known manner, and the output image C produced from block 4 is a reduced grey level image data having p grey levels ($q \geq p$), from level 0 to level p−1, particularly at the edges of the character lines.

First, the threshold level determining block 1 and the quantization level determining block 2 are described. In block 2, a quantization level $L_h$ is determined for use in quantizing the original grey level image data to the reduced grey level image data.

Figure 4:
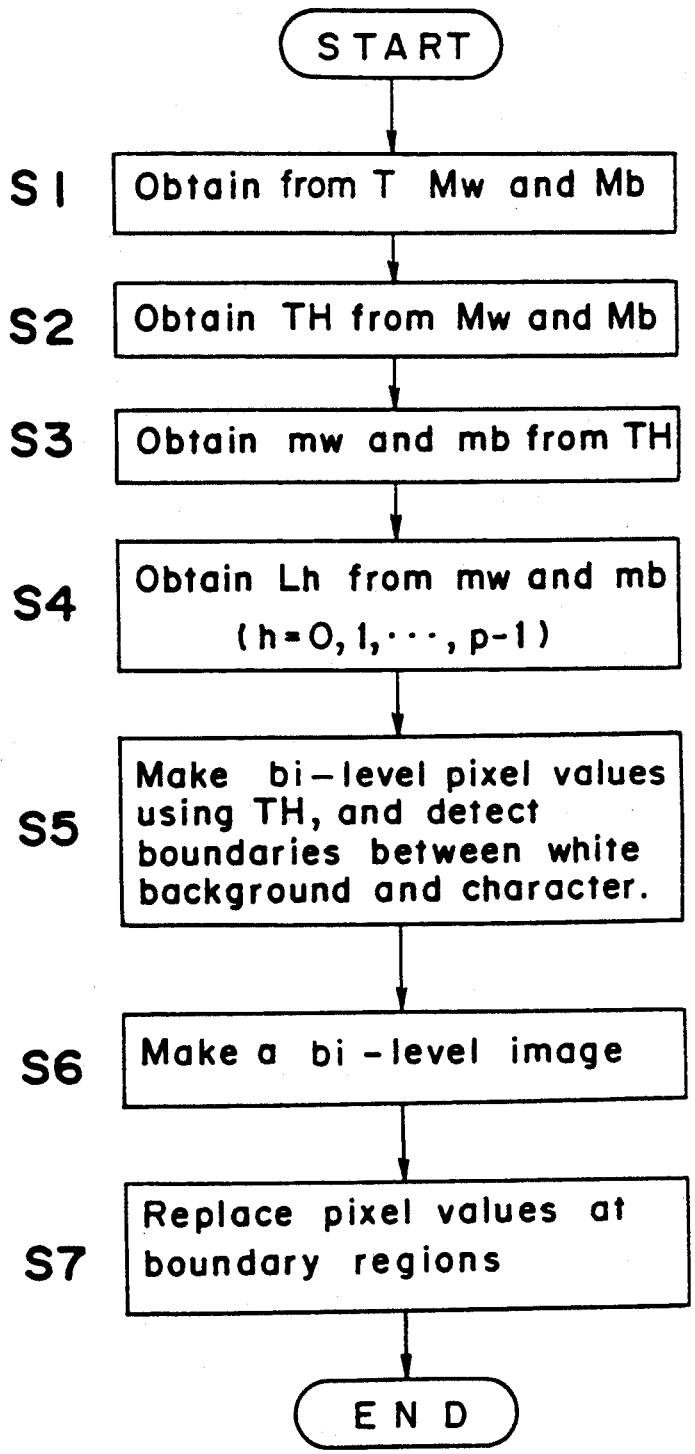
FIG. 4 is a flow chart for carrying out the grey level reduction in the system shown in FIG. 3.

Using an histogram of the original grey level image data, an average (or the most frequently occurring grey level) Mw of the grey levels in a region not smaller than a provisional threshold T, and another average (or the most frequently occurring grey level) Mb of the grey levels in a region smaller than the provisional threshold T are obtained (step S1 in FIG. 4). Then, by the following formula (1), a threshold TH is determined (step S2) for generating the bi-level data (data having only two levels for one pixel):

$$TH = (Ww \cdot Mw + Wb \cdot Mb)/(Ww + Wb) \quad (1)$$

in which weighting values Ww and Wb are obtained empirically. According to one example, Ww=3 and Wb=2 are used. The provisional threshold T may be equal to q/2, but can be selected anywhere between the two peak points, representing the background and characters, on the histogram.

Then using the threshold TH, two averages are obtained in a manner similar to the above. More specifically, an average (or the most frequently occurring grey level) mw of the grey levels in a region not smaller than the threshold TH, and another average (or the most frequently occurring grey level) mb of the grey levels in a region smaller than the threshold TH are obtained (step S3).

Thereafter, a quantization level $L_h$ (h=0, 1, ..., p) is defined as follows (step S4).

$$L_h = \begin{bmatrix} 0 & (h = 0) \\ \{hmb + (p - h)mw\}/p & (0 < h < p) \\ q & (h = p) \end{bmatrix} \quad (2)$$

Figure 5:
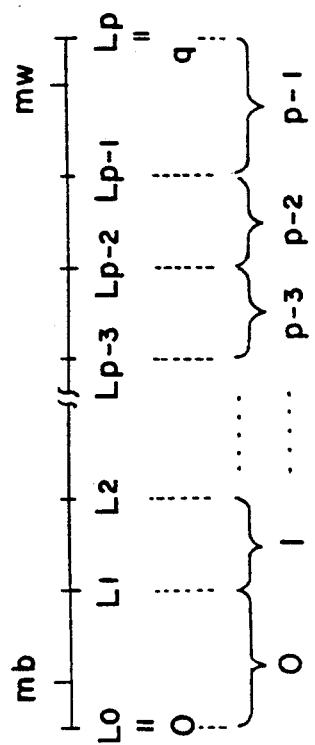
FIG. 5 is a diagram showing a relationship between the grey levels before and after the reduction thereof.

In the above example, the quantization level is obtained by equally dividing the range between mb and mw into a plurality of sections, but can be obtained by non-equally dividing the range. A further detail of the quantization is disclosed, for example, in Max, J: Quantization for minimum distortion, IRE Trans. IT-6, 7 through 12, 1960. Within the original grey levels, only the grey levels X which satisfy the equation:

$$L_h \leq X < L_{h+1}$$

are used in the quantization step to obtain the reduced grey levels h (h=0, 1, ..., p−1). An example of quantization is shown in FIG. 5.

Next, the block 3 is described, in which, the steps for obtaining the boundary between the white background and character portion are operated.

An original image A is scanned horizontally to obtain a grey level for each pixel. When the pixel position on the X-Y coordinate is given by (i,j), the grey level of that pixel is expressed by $a_{ij}$ and is referred to as a pixel value. Each pixel value is compared with the threshold TH. If the pixel value $a_{ij}$ is greater than the threshold TH, that pixel value is replaced with a new pixel value (p−1), and if it is smaller than the threshold, that pixel value is replaced with a new pixel value 0. In this manner, all the pixel values are represented either by (p−1) or 0, as indicated by the following formula:

$$b_{ij} = \begin{bmatrix} p - 1 & (a_{ij} \geq TH) \\ 0 & (a_{ij} < TH) \end{bmatrix} \quad (3)$$

to form a bi-level image (an image formed by pixels representing either black or white with no intermediate level). By the use of the bi-level image, the boundary between pixel values p−1 and 0 is considered as a boundary between the white background and character image (step S5).

In step S5, although the same threshold TH as that used for obtaining the quantization level is used for obtaining the boundary, a different threshold TH' may be used. Such a different threshold TH' may be obtained by formula (1) using weighting values Ww' and Wb' and also using averages Mw' and Mb' obtained based on a provisional threshold T'.

To obtain the boundary, instead of obtaining the bi-level image directly from the original image as described above, it is possible to obtain the binary image from a differentiated image (using first order differentiation, Laplacian, etc) of the original image, or by using a zero-crossing method, such as disclosed in a Japanese article "Edge and Line Detection" by Ihokuchi et al. in a book "O plus E [Recent development of the image processing algorithm]" pages 205–218, published 1986.

After the boundary is obtained, the bi-level image B is defined as follows:

$$b_{ij} = \begin{bmatrix} p - 1 & \text{(white background portion)} \\ 0 & \text{(character portion)} \end{bmatrix} \quad (4)$$

Finally, block 4 is described, in which a p grey level text image C is formed.

Before describing the operation carried out in block 4, the reason for inserting the block 4 is explained.

For example, if a character, such as "x", having a diagonally extending line is included in the bi-level image B which is defined by only two, black and white, pixels, the side edges of the diagonal lines do not show straight edges/ but show ragged edges, resulting in characters difficult to read. Thus, in block 4, intermediate grey-level pixels are provided along the edges of the line to hide the ragged edges so as to make the line look more straight.

At step S6, an image C is formed provisionally using the bi-level pixel values $b_{ij}$. Then, within the bi-level image C, the pixel values at the boundary regions are replaced with separately obtained pixel values using the quantization level obtained from block 2 (step S7). Thus, the values of the separately obtained pixels, which are located along the edges of the character image, have p grey levels obtained through the quantization process, using the quantization level $L_h$, from the original image data. In this manner, the reduced grey level image C is generated.

Next, three methods for determining the boundary region pixels that receive replacement pixel values at step S7 are explained.

(i) The bi-level image B is scanned horizontally to detect boundaries at which data changes between 0 and p−1. Then, n pixels before and n pixels after the detected boundary in horizontal direction are marked, as diagrammatically shown in FIG. 6a. Then, in the image C, the pixel values for the marked pixels are replaced with the pixel values expressed by p grey levels.

In a similar manner to the above, the bi-level image B is scanned vertically to detect boundaries at which data changes between 0 and p−1. Then, n pixels above and n pixels below the detected boundary, in the vertical direction are marked. In the image C, the pixel values for the marked pixels are replaced with the pixel values expressed by p grey level.

(ii) In a similar manner to the above, the bi-level image B is scanned horizontally to detect boundaries at which data changes between 0 and p−1. Then, n1 pixels before and n1 pixels after the detected boundary in horizontal direction are marked. Then, in the image C, the pixel values for the marked pixels are replaced with the pixel values expressed by p grey levels.

Then, not image B, but image C, is scanned vertically to detect boundaries at which data changes not only between 0 and p−1, but also between other different levels. Then, n2 pixels above and n2 pixels below the detected boundary in vertical direction are marked. Then, in the image C, the pixel values for the marked pixels are replaced with the pixel values expressed by p grey levels.

There, the horizontal and vertical relationship can be exchanged.

(iii) The bi-level image B is scanned horizontally to check four sides (top, bottom, left and right sides) of each pixel.

Figure 6A:
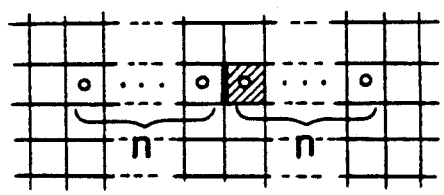
FIGS. 6a to 6e are diagrams of pixel alignments showing boundary lines between the white background and character portion, and also pixels that will be replaced with pixels having intermediate pixel values.

If the boundary is detected in any one of the four sides, n pixels before (or above) and n pixels after (or below) the detected boundary side are marked, such as shown by single circle marks in FIG. 6a.

Figure 6B:
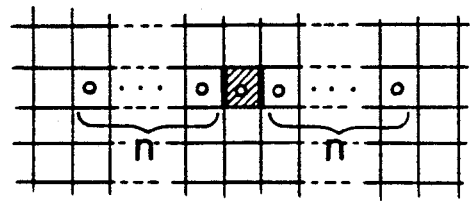

If the boundary is detected in any opposing two sides, n pixels before (or above) the first detected boundary side and n pixels after (or below) the second detected boundary side are marked, such as shown by single circle marks in FIG. 6b.

Figure 6C:
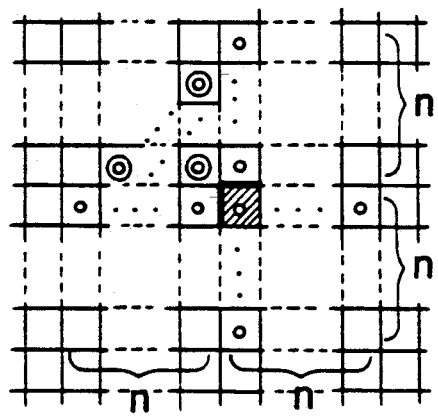

If the boundary is detected in any neighboring two sides, n pixels before (or above) and n pixels after (or below) each of the detected boundary sides are marked by a single circle mark; and pixels located close to the corner of the two detected boundary sides and caught in a triangle area between two single circle marked pixel alignments are further marked, such as shown by double circle marks in FIG. 6c.

Figure 6D:
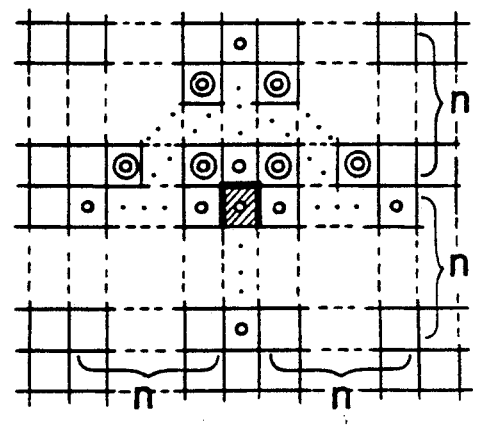

If the boundary is detected in any three sides, n pixels before (or above) and n pixels after (or below) the each of the detected boundary side are marked by a single circle marks; and pixels located closed to each corner of the two detected boundary sides and caught in each triangle area between two single circle marked pixel alignments are further marked, such as shown by double circle marks in FIG. 6d. There are two such triangle areas in this example.

Figure 6E:
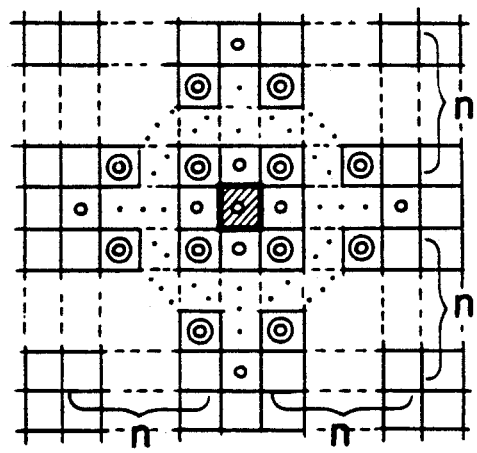

If the boundary is detected in all four sides, n pixels before (or above) and n pixels after (or below) the each of the detected boundary side are marked by a single circle marks; and pixels located closed to each corner of the two detected boundary sides and caught in each triangle area between two single circles marked pixel alignments are further marked, such as shown by the double circle marks in FIG. 6e. There are four such triangle areas in this example. Then, in the image C, the pixel values for the marked pixels are replaced with the pixel values expressed by the p grey levels.

In the above given methods, the values n, n1 and n2 are determined with respect to various conditions, such as the total pixel amount of the character. For example, when the total pixel amount of the character is 20×20, each of the values n, n1 and n2 may be equal to 2.

By making the image C in the above described manner, the pixels carrying the intermediate grey-levels will be produced only around the character edges, and all the other areas are occupied by pixels of white or pixels of black. Thus, the background is maintained completely white with no stain.

Figure 7:
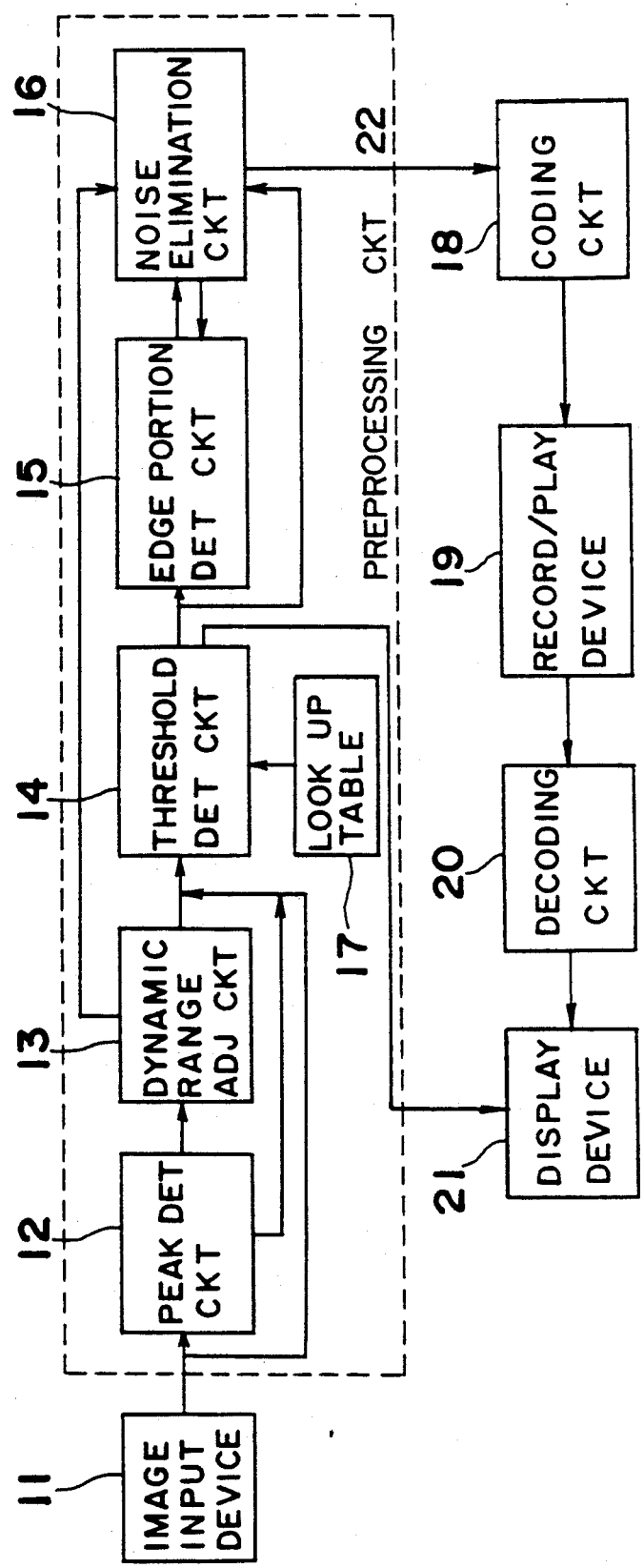
FIG. 7 is a block diagram of a grey level reduction system, according to another preferred embodiment of the present invention.

Referring to FIG. 7, a modification of a grey level reduction system is shown. In an image input device 11, such as an image scanner, is provided for reading the original image into M-bit grey level digital data so that the pixel value for black is "0", the pixel value for white is "$2^M-1$" and the pixel value for the grey is an intermediate value between "0" and "$2^M-1$". A peak detection circuit 12 is provided in which a histogram hi (hi represents the number of occurrences of the pixels having a pixel value of grey level region i) is formed to obtain an average pixel value $M_b$ relative to a first peak point in the histogram representing the black points, and another average pixel value $M_W$ relative to a second peak point representing the white points. The average pixel values $M_b$ and $M_W$ are obtained by the following equation:

$$\begin{aligned} M_b &= \sum_{i=0}^{T-1} hi \cdot i / \sum_{i=0}^{T-1} hi \\ M_W &= \sum_{i=T}^{2^M-1} hi \cdot i / \sum_{i=T}^{2^M-1} hi \end{aligned} \qquad (5)$$

in which T is the provisional threshold.

The system shown in FIG. 7 further comprises a dynamic range adjusting circuit 13 which carries out the processing according to equation (6) given below so as to produce a reduced grey level image defined by $2^N$ (M>N) level grey image data (N-bit grey level digital data), as diagrammatically shown in FIG. 8.

$$\begin{aligned} d' &= (M_W - M_b - 1)/(2^N - 1) \\ Qi' &= [M_b + d'xi + 0.5] \ (0 \leq i \leq 2^N - 1) \\ d &= (2^M - 1)/(2^N - 1) \\ Qi &= [dxi + 0.5] \ (0 \leq i \leq 2^M - 1) \end{aligned} \qquad (6)$$

wherein d' is a step size of the image data obtained from image input device 11; Qi' is a quantization value of each grey level region i; d is a step size after the image data is converted to $2^N$ grey level image data; and Qi is a quantization value after the image data is converted to $2^N$ grey level image data.

By the above conversion process, the deviation of the white peak point and black peak point can be eliminated to bring such peak points to their appropriate points.

The dynamic range adjusting circuit 13 produces the $2^N$ grey level image data which is in turn applied to a threshold detecting circuit 14 for detecting a threshold TH obtained by the following equation (7):

$$TH = (M_b + M_W)/2 \qquad (7)$$

It can be said that TH determines a minimum line width that can be depicted by the image data on display device 21, because TH determines the boundary between the black area and white area. Here, instead of using equation (7), TH may be made variable to have the user select his or her desired TH while viewing the display device 21, with the black line width being changed in accordance with a change of the TH value.

Figure 9:
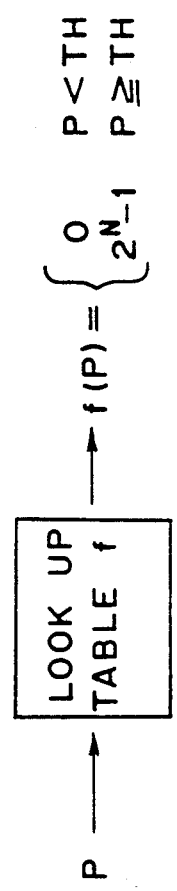
FIG. 9 is a diagram showing a look up table.

For the purpose of setting the threshold TH, a look up table 17 may be employed, such as diagrammatically shown in FIG. 9. The look up table 17 may be used such that pixel values f(P) below the threshold TH selected by the user are assigned with "0" representing black, pixel values f(P) equal to or above the threshold TH are assigned with "$2^M-1$" representing white. Then, by the use of the look up table 17, the $2^N$ grey level image data is displayed on display device 21, and the change of the black line width can be observed as the threshold TH is varied, thereby selecting the desired threshold TH.

The threshold TH as produced from threshold detecting circuit 14 is applied to an edge portion detecting circuit 15, and is used for making the bi-level image.

In the edge portion detection circuit 15, the bi-level data is obtained by the following equation (8):

$$y = \begin{bmatrix} 0 & (x < TH) \\ 2^M - 1 & (x \geq TH) \end{bmatrix} \quad (8)$$

in which x is the pixel value before the conversion and y is the pixel value after the conversion to make the two-level image.

The edge portion detecting circuit 15 and a noise elimination circuit 16, which are similar to block 3 described above, are provided for obtaining the boundary between the white background and character portion. In the noise elimination circuit 16, edge portions, such as shown in FIG. 10, where the neighboring pixels have different pixel values are detected. Then, the pixel values at the boundary regions, such as defined by the above described methods (i), (ii) or (iii), are replaced with separately obtained pixel values using the quantization level obtained from dynamic range adjusting circuit 13.

Since the noise elimination circuit 16 detects the boundary where the pixel values change, a pixel having a pixel value greater than the threshold TH and thus converted as having a pixel value of $2^M-1$ (representing white) will be produced as a pure background, resulting in the elimination of any intermediate grey level spots.

The peak detection circuit 12, dynamic range adjusting circuit 13, threshold detection circuit 14, edge detection circuit 15 and noise elimination circuit 16 taken together define a preprocessing circuit 22 for the image data coding and decoding device.

The image data as obtained in the above described circuit 22 is applied to a coding circuit which will be described in detail later.

One specific example for the modification described above is given below.

Image input device 11 reads an original, such as shown in FIG. 11a, and provides an 4-bit (16 grey level) image data pattern with 8×8 pixels, such as shown in FIG. 11b, to peak detection circuit 12. A provisional threshold T is now set T=7.

FIG. 12 shows a histogram of the pixel values (grey levels) of the 4-bit level image data. By the use of the above equation (5), the pixel value $M_W$, representing the white peak point, and the pixel value $M_b$, representing the black peak point are obtained, and the results are as follows:

$$M_b = 3$$

$$M_W = 12.$$

Then, the maximum pixel values $M_b$ and $M_W$ are applied to dynamic range adjusting circuit 13 for carrying out the treatment based on the above equation (6) to convert the 4-bit image data to a reduced bit, such as 2-bit (4 grey level) image data. In this step, equation (6) determines the step size and quantization value for the images before and after the conversion as given below:

$$d' = (12-3-1)/(4-1) = 2.7$$
$$Q0' = 3,$$
$$Q1' = 6,$$
$$Q2' = 8,$$
$$Q3' = 11,$$
$$d = (16-1)/(4-1) = 5.0$$
$$Q0 = 0,$$
$$Q1 = 5,$$
$$Q2 = 10,$$
$$Q3 = 15.$$

Figures 13A, 13B, 14, 15:
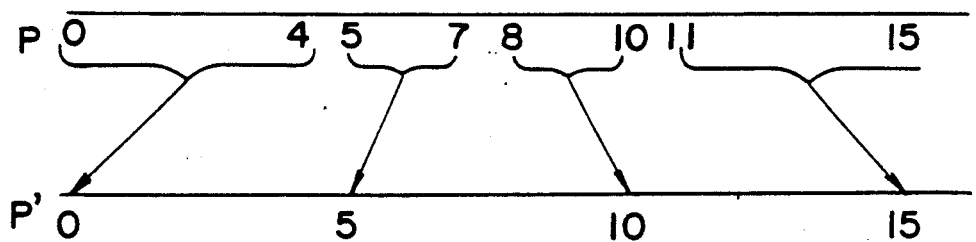

Thus, the pixel values P of the pixels obtained from image input device 11 are converted, as shown in FIG. 13a, to new pixel values P' as indicated below:

$$P \leq 4 \rightarrow P' = Q0 = 0$$
$$5 \leq P \leq 7 \rightarrow P' = Q1 = 5$$
$$8 \leq P \leq 10 \rightarrow P' = Q2 = 10$$
$$11 \leq P \rightarrow P' = Q3 = 15.$$

Here, the boundary of the P region is calculated based on the values Q0', Q1', Q2' and Q3' (for example, an average between Qi' and Qi1'). The converted 2-bit (4grey level) image is shown in FIG. 13b.

By circuit 22, the pixel values of the image data, before the conversion, varied between 2 and 13, but after the conversion, varied between 0 and 15, thus resulting in widening of the dynamic range.

Next, the threshold TH is obtained by the following formula using white peak value $M_W=12$ and black peak value $M_b=3$:

$$TH=(M_W+M_b)/2=8.$$

Instead of the above formula, the threshold TH can be obtained by the use of a look up table 17.

When the threshold TH is determined, the bi-level image (FIG. 14) using the pixel values P", $$P'=0 \ (P \leq TH)$$

$$P'=15 \ (P > TH),$$

is formed in the edge detection circuit 15 by converting the pixel values P' of the image data from the dynamic range adjusting circuit 13.

Edge detection circuit 16 scans the bi-level image first in the horizontal directions to obtain boundaries where the pixel value changes between two neighboring pixels in vertical direction, as shown in FIG. 15.

Figures 16, 17, 18, 19:
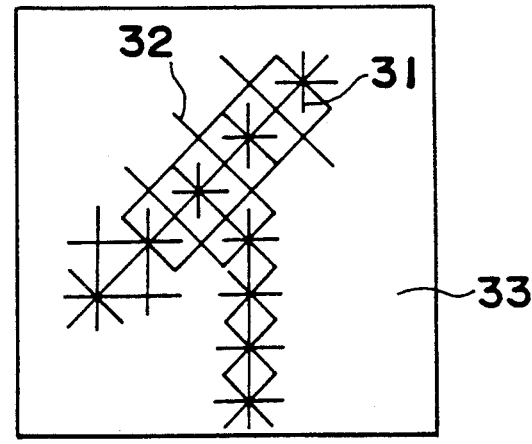
FIG. 16 is a bi-level image data pattern with the vertically extending boundary portion shown in FIG. 15 being replaced with 4 bit image data.
FIG. 17 is a bi-level image data pattern obtained by vertically scanning the image data pattern of FIG. 16 to obtain horizontally extending boundary portions.
FIG. 18 is a bi-level image data pattern with the horizontally extending boundary portion shown in FIG. 17 being replaced with 4 bit image data.
FIG. 19 is an image on a screen formed by the image data obtained from FIG. 18.

Then, noise elimination circuit 16 replaces the pixel values at the edge portions in the bi-level image with the pixel values obtained dynamic range adjusting circuit 3 (i.e., with the four-level image data), as shown in FIG. 16. The portions other than the edge portions still carry the bi-level image data. Thereafter, the bi-level image is scanned in the vertical directions to obtain boundaries extending in the horizontal direction (FIGS. 17 and 18).

In this manner, the image data at the boundary portions are expressed by the use of intermediate grey level data, while the portions other than the boundary portions are expressed by the bi-level image data. Thus, rugged edge lines can be eliminated as explained below. Although the edges that extend vertically or horizontally can be depicted with fine straight line on the screen due to horizontal and vertical alignment of pixels, the edges of slanted lines may be oriented in rugged lines. However, because the boundary area is blurred with intermediate grey-level pixels, slanted lines look as smooth as the vertical or horizontally extending lines. Furthermore, the areas other than the boundary area are either completely white or completely black. Thus, the granular noises can be eliminated.

In FIG. 19, portions 31 indicated by mark "*" are occupied by pixels with pixel value "0" representing black, and portions 32 indicated by mark "x" are occupied by pixels with pixel value "5" or "10" representing intermediate grey-levels at boundary portions. The remaining portions 33 are occupied by pixels with pixel value "15" representing white background.

When the image data such as shown in FIG. 19 is coded in coding circuit 18, the coding can be effected with a high compression rate without deteriorating the picture quality.

2. System for Compressing Character Image Data

First, a run length coding system is described. As shown in FIG. 20a, a run length coding system 40 receives N bit image data, such as from grey level reduction system 6 shown in FIG. 3, and comprises an imaginary plane scan circuit 41, run length detecting circuit 42, run length MH coding circuit 43, compression coding circuit 44, and control circuit 45.

In imaginary plane scan circuit 41, bit plane dividing method is carried out as described below.

In the image data, for a white spot, a pixel has a maximum pixel value, expressed by N one's (111 ... 1); for a black spot, a pixel has a minimum pixel value, expressed by N zero's (000 ... 0); and for grey spot, a pixel has a pixel value expressed by a combination of one's and zero's.

In the imaginary plane scan circuit 41, white spot pixel value (111 ... 1) are replaced with a symbol alignment having a combination of a first special mark, such as "3", followed by a train of (N−1) common special marks, such as "*". Thus, in circuit 41, white spots are expressed as (3** ... *), as diagrammatically shown in FIG. 21.

Similarly, black spot pixel values (000 ... 0) are replaced with a symbol alignment having a combination of a second special mark, such as "2", followed by a train of (n−1), common special marks "*". Thus, in circuit 41, black spots are expressed as (2** ... *). Other spots, which are grey spots, are expressed by binary codes, i.e., a symbol alignment which is a combination of 1's and 0's.

Figure 21:
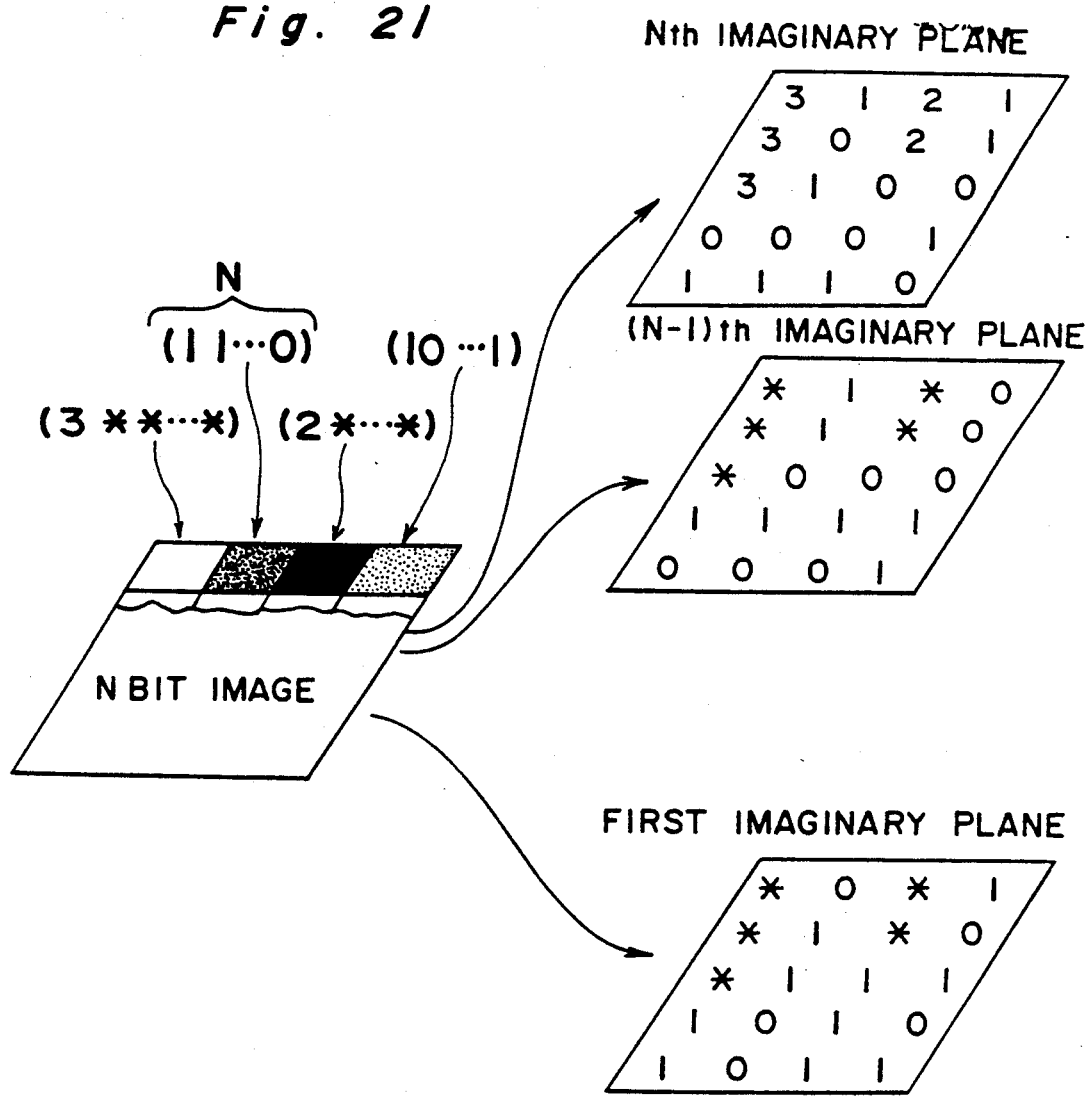
FIG. 21 is a diagrammatic view of a bit plane dividing method according to the present invention.

Furthermore, in the imaginary plane scan circuit 41, the image data is divided into first to Nth bit planes, as explained below in connection with FIG. 21.

Each pixel value is expressed by N symbols and, therefore, N sheets of imaginary planes are prepared and are numbered from first to Nth. The Nth imaginary plane is defined by the collection of the most significant symbol (MSS) from each pixel value symbol alignment. The collected MSSs are aligned at corresponding pixel positions in the Nth imaginary plane. Thus, the Nth imaginary plane is formed by a combination of four different symbols 0, 1, 2 and 3. Similarly, the (N−1)th imaginary plane is defined by the collection of the second most significant bit from each pixel value symbol alignment, and so on, and the first imaginary plane is defined by the collection of the least significant symbol (LSS) from each pixel value symbol alignment. Thus, each of the first to (N−1)th imaginary planes is formed by a combination of three different symbols 0, 1 and *.

Then, in the run length detecting circuit 42, the symbols on the Nth imaginary plane are serially read out from the top row to the bottom row, with a third special symbol inserted each time a new line is read out. Then, the symbols on the (N−1)th imaginary plane are serially read out, and so on, until the first imaginary plane is read, with a fourth special symbol inserted each time a new plane is read out. Then, skipping the common symbol *, readout symbols are serially stored in a suitable storing means, and run lengths for four different symbols, 0, 1, 2 and 3 are detected.

The above operation is further explained with reference to FIG. 22. As diagrammatically, shown, the pixels in the first row represent, from left to right, white, white, white, grey, grey, black, black, black, white and white. Thus, the first three pixels have a pixel value expressed by all 1's (111 ... 1), as shown in vertically. The next two pixels have a pixel value expressed by a combination of 1's and 0's. The next three pixels have a pixel value expressed by all 0's (000 ... 0), and the last two pixels have a pixel value expressed by all 1's (111 . .. 1). Then, by the imaginary plane scan circuit 41, the binary code alignment is changed to symbol alignment. For example, for the first pixel, (111 ... 1) is converted to (3** ... *), as shown vertically. Then, in run length detecting circuit 42, symbols are read from the Nth imaginary plane from top row to bottom row. Thus, in the example shown in FIG. 22, the read out symbols will be as follows:

| | |
|---|---|
| Nth | //3331022033/.. ../.. ../... |
| (N-1)th | //*110**/..../.. ../... |
| (N-2)th | //*010**/.. ../.. ../... |
| : | |
| First | //*011**/.. ../.. ../... | in which / represents the third symbol for separating the lines and // represents the fourth symbol for separating the imaginary planes.

After the symbols 0, 1, 2, 3, *, and // are aligned in the above described manner, symbol * is eliminated. Thus, the alignment would be as follows:

| | |
|---|---|
| Nth | //3331022033/.. ../.. ../... |
| (N-1)th | //110/.. ../.. ../... |
| (N-2)th | //010/.. ../.. ../... |
| : | |

-continued

| First | //011/.. ../.. ../... |
|---|---|

Then, the above alignment, i.e., the alignment of the symbols other without than *, is taken into consideration for detecting the run length in each line. In the first line of the Nth imaginary plane, the following run lengths are detected:

three 3's, one 1's, one 0's, two 2's, one 0's and two 3's.

Similarly, the first line in the (N−1)th imaginary plane has the following run lengths:

two 1's and one 0's.

In this manner, run lengths are detected in run length detecting circuit 42 for all the symbol alignments, and the detected run lengths are coded in run length MH coding circuit 43 in a manner described below.

According to one example, a Modified Huffman coding method is employed for coding each run length. The coded run lengths are stored serially in a memory with a suitable indicator added at the head of each imaginary plane, and for each imaginary plane, the run lengths are stored as follows.

Figure 23A:
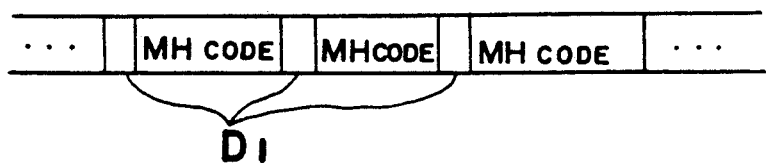
FIGS. 23a and 23b are diagrammatic views showing alignment of the coded image data according to the MH coding method of FIG. 22.

Since the Nth imaginary plane has four different symbols, 0, 1, 2 and 3, a two-bit indicator D1, for indicating one of the four different symbols, is inserted at the head of each run length, as shown in FIG. 23a, for storing the data in the Nth imaginary plane.

Figure 23B:
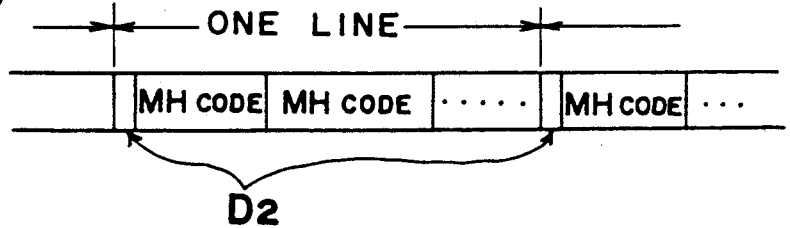

Since the imaginary planes other than Nth imaginary plane have two different symbols, 0 and 1, a one-bit indicator D2, for indicating one of the two different symbols, is inserted at the head of each line, as shown in FIG. 23b. In this manner, the type of the symbols in the first run length is identified. The type of the symbols in the second run length is the other one of the two, and the types of the following run lengths are changed alternately between the two types. Thus, in the imaginary planes other than Nth imaginary plane, the type of the symbols in all the run lengths is known when the type of the symbols in the first run lengths in each line is identified.

The above embodiment is described in connection with imaginary planes for better understanding of the invention, but such imaginary planes may not be prepared. From a practical viewpoint, the detection of the run length and MH coding can be carried out directly from the image data carrying N−bit binary data for each pixel.

Figure 24:
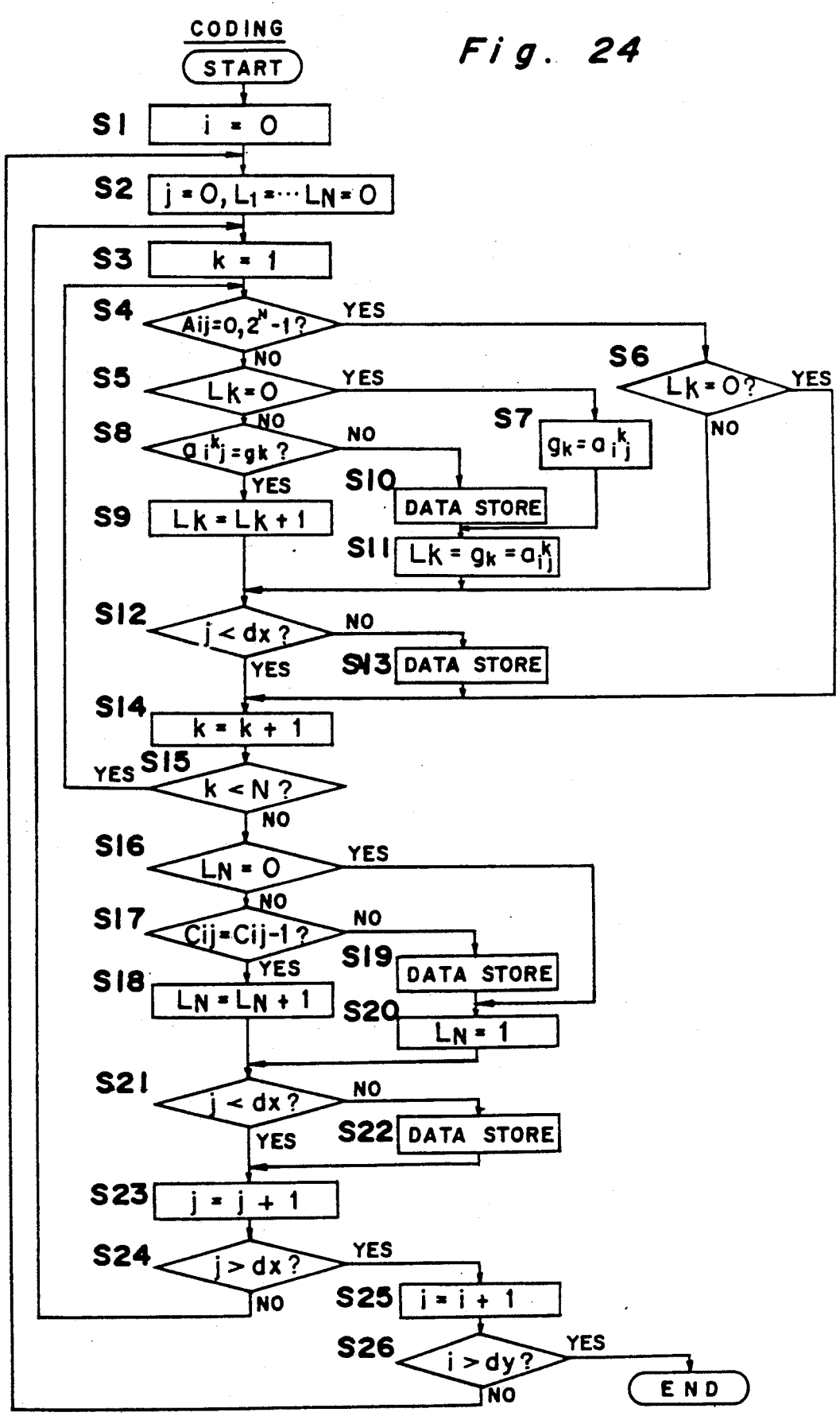
FIG. 24 is a flow chart showing an operation of the system of FIG. 20a for coding the image data according to the MH coding method.

Referring to FIG. 24, a flow chart for effecting the coding is shown. In the flow chart, the pixel position on the X-Y coordinate is given by (j,i), and the grey level of that pixel is expressed by $A_{ij}$, which is referred to as a pixel value. The pixels having pixel values of intermediate grey levels ($1 \leq a_{ij} \leq 2^N - 2$) are expressed by N-bit binary codes:

$$(a_{ij}^1, a_{ij}^2, a_{ij}^3, \ldots, a_{ij}^N),$$

in which the kth significant bit is expressed by:

$$a_{ij}^k \ (=1 \text{ or } 0),$$

wherein $k = 1, 2, 3, \ldots, N$. The pixels having pixel value of the maximum grey level (1,1,1,1, ... 1), which are representing white, or the pixels having pixel value of the minimum grey level (0,0,0,0, ... , 0), which are representing black, are expressed by $b_{ij}$ as indicated below:

$$b_{ij} = \begin{cases} 2 & (A_{ij} = 0) \\ 3 & (A_{ij} = 2^N - 1) \end{cases}$$

Also, in the flow chart, $L_k$ ($k=1, 2, 3, \ldots, N$) indicates a run length in plane k, and $c_{ij}$ is defined as follows:

$$c_{ij} = \begin{cases} b_{ij} & (A_{ij} = 0 \text{ or } 2^N - 1) \\ a_{ij}^N & (A_{ij} = 1, 2, 3, \ldots, 2^N - 2) \end{cases}$$

Furthermore, dx and dy indicates the number of pixels aligned horizontally and vertically, respectively, of the original image plane, and $g_k$ represents the type of run length.

Figure 22:
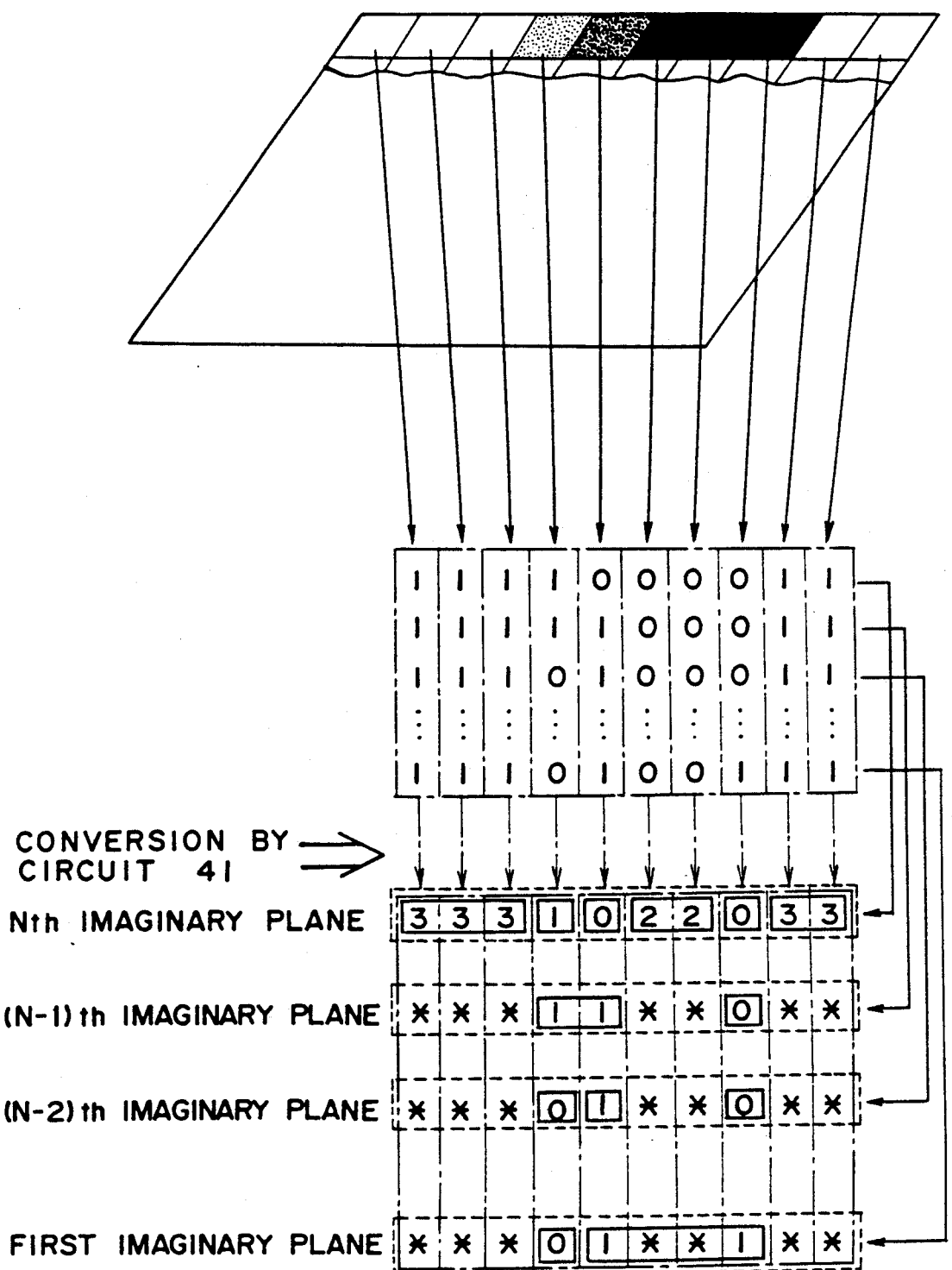
FIG. 22 is an diagrammatic view of a MH coding method according to the present invention.

The operation of the flow chart of FIG. 24 is for coding the run lengths data $A_{00}$ ($=2^N-1$), $A_{01}$ ($=2^N-1$), ... shown in FIG. 22. The data shown in FIG. 24 is such that $i=0, 1, 2, \ldots, 9$ and $dx=9$.

At steps S1, S2 and S3, initialization is effected. Then, at step S4, it is detected whether or not the detected pixel is representing a white/black level or another intermediate grey level. According to the example of FIG. 22, since $A_{00}=2^N-1$ (representing white), the program advances to step S6; and since $L_1=0$, the program further advances to step S14, at which $k=k+1$ (=2 at this time) is effected. Then, at step S15, since $k=2<N$, the program returns to step S4. Then, the steps S4, S6, S14 are repeated for (N−2) times. Then, when it is detected at step S15 that $k=N$, the program advances to step S16. At this time, since $L_N=0$, the program goes to step S20 for setting $L_N=1$. Then, since $j=0$, the program goes from step S21 to S23 to increment j. Thus, $j=j+1$ (=1). Then, since $j=1$ and $dx=9$, the program returns from step S24 to S3 for effecting steps S3, S4, S6 and S14 for pixel $A_{01}$. Thereafter, steps S15, S4, S6 and S14 are repeated (N−2) times. Then, when $k=N$ is detected at step S15, the program goes to step S16 and further advances to step S17, since $L_N=1$. At step S17, since $c_{01}=c_{00}=3$, the program goes to step S18 to effect $L_n=L_n+1$ (=2). Then, at step S21, since $j=1$, the program advances to step S23 to effect $j=j+1$ (=2). At step S24, since $j=2<dx=9$, the program returns to step S3. Then, pixel $A_{02}$ is scanned. Accordingly, after passing steps S3, S4, S6 and S14, steps S15, S4, S6 and S14 are repeated for (n−2) times. Then, when $k=N$ is acquired, $k=N$ is detected at step S15, and the program advances to step S16. Since $L_N=2$, the program goes from step S16 to S17, and since $c_{02}=c_{01}=3$, the program advances to step S18 at which $L_N=L_N+1$ (=3) is effected. Then, at step S21, since $j=2<dx=9$, the program goes from step S21 to S23 to effect $j=j+1$ (=3). Thereafter, the program goes to step S24, and since $j=3<dx=9$, it goes further to step S3 to start scanning pixel $A_{03}$.

At step S3, after setting $k=1$, it is detected at step S4 that $A_{03}\neq 0$ and $A_{03}\neq 2^N-1$. Then, the program advances from step S4 to step S5. At step S5, since $L_1=0$, the program goes to step S7 for setting the data $g_1=a_{03}^1=0$ and thereafter, at step S11, $L_1=1$ is set. Then, at step S12, since $j=3<dx=9$, the program goes to step S14 at which $k=k+1$ (=2) is effected. Then, at step S15, since $k=2<N$, the program returns from step S15 to S4. Thereafter, steps S4, S5, S7, S11, S12, S14, S15 are repeated (N−2) times.

Then, since $L_n=3$, the program goes from step S16 to S17. Furthermore, since $c_{03}=1$ and $c_{02}=3$, the program advance from step S17 to S19 for storing data $c_{02}=3$, and run length $L_n=3$. Thereafter, at step S20, $L_N=1$ is set. Then, at step S21, since $j=3$, $j=3<dx=9$, the program advances from step S21 to S23 to effect $j=j+1$ (=4), and then it advances further to step S24. At step S24, since $j=4<dx=9$, the program returns back to step S3. Thereafter, at step S3, $k=1$ is set. After step S4, the program advances to step S5. Since $L_1=1$, the program goes from step S5 to S8. At step S8, it is detected whether or not $a_{ij}{}^k=g_k$. Since $a_{04}{}^1$ (=1) is different from $g_1(=0)$, which is already set), the program advances from step S8 to S10 to store data $g_1=0$ representing the type of the symbols in the run length and the length $L_1=1$ of the run. Then, at step S11, $L_1=1$ and $g_1=a_{04}{}^1=1$ are set, and at step S12, since $j=4<dx=9$, the program advances from step S12 to S14 to effect $k=k+1$ (=2). Then, since $k=2<N$, the program returns from step S15 to S4. Then, steps S4, S5, S8, S10, S11, S12 (or S4, S5, S8, S9, S12), S14 and S15 are repeated for the cases of $k=2, 3, \ldots, (N-3)$. Then, at step S4, since $A_{04}\neq 0$ or $2^N-1$ the program goes to step S5 in which $L_{N-2}=1$ is detected and, thus the program advances to step S8. At step S8, since $a_{04}{}^{N-2}=1$ and $g_{N-2}=0$, the run length $L_{N-2}=1$ is stored. Then, after steps S11, S12 and S14, step S15 is carried out. Since $k=N-1$ the program returns from step S15 to S4. At step S4, since $A_{ij}\neq 0$ or $2^N-1$ the program advances to step S5, and further to S8, since $L_{N-1}$. At step S8, since $a_{04}{}^{N-1}=1$ and $g_{N-1}=1$, the program advances to step S9. At step S9, $L_{N-1}=2$ is set, and thereafter, the program advances through steps S12 and S14 to step S15. Since $k=N$, the program goes from step S15 to S16. At step S16, since $L_N=1$, the program goes to step S17. Since $c_{04}=0$ and $c_{03}=1$, the program goes from step S17 to S19 at which data $c_{03}=1$, representing the type of the symbol of the run length, and $L_N=1$, representing the run length are stored. Thereafter, at step S20, $L_N=1$ is set and thereafter, at step S21, since $j=4<dx=9$, the program advances to step S23 for setting $j=5$. Then, since $j=5<dx=9$, the program returns from step S24 to S3. Thereafter, similar operations are carried out to effect the run length coding.

As has been described above, during the storing of the coded data of the first to (N−1)th imaginary planes, the type $g_k$ of symbols in the run length is stored only at the beginning of each line. For example, according to the above example, when $j=7$ and $k=N-2$, of the two data $g_{N-2}=1$ and $L_{N-2}=1$, only $L_{N-2}$ will be stored so the data $g_{n-2}=1$ is only used for comparing with $a_{ij}{}^k$ at step S8.

The coded and compressed data is recoded in the above described manner. Next, the decoding of the compressed data will be described.

Referring to FIG. 20b, a decoding circuit 50 includes an MH code reading circuit 51, run length decoding circuit 52, imaginary plane reestablishing circuit 53, N bit image reestablish circuit 54 and control circuit 35. The decoding of the compressed data is carried out in the following manner.

In MH code reading circuit 51, the compressed and coded data is decoded. Thus, the run length data is changed to data aligned in the first to Nth imaginary plane.

For the Nth imaginary plane, the two-bit indicator D1, indicating one of the four different symbol types (0, 1, 2 and 3), and the run length data, indicating the length of the run, are decoded from the compressed data. Then, the decoded symbols are aligned in Nth imaginary plane.

For the imaginary plane other than the Nth imaginary plane, the one-bit indicator D2, indicating one of the two symbol types (1 and 0), and the run length data, indicating the length of the run, are decoded from the compressed data, and the decoded symbols are aligned in the corresponding imaginary plane. In this case, the bit positions in the imaginary plane corresponding to the bit positions of symbols "2" and "3" provided in the Nth imaginary plane are skipped. Also, at the beginning of each line, the data indicating the type of symbol for the first run is read. For the second run, the other symbol is repeated, and for the following runs, the two symbols are changed alternately.

When the first to Nth imaginary planes are reproduced in the above described manner, the original n bit image data is obtained and, accordingly, the decoding process completes. In practice, it is not necessary to actually reproduce the N imaginary planes. The N bit image data can be directly obtained from the run length data.

Figure 25:
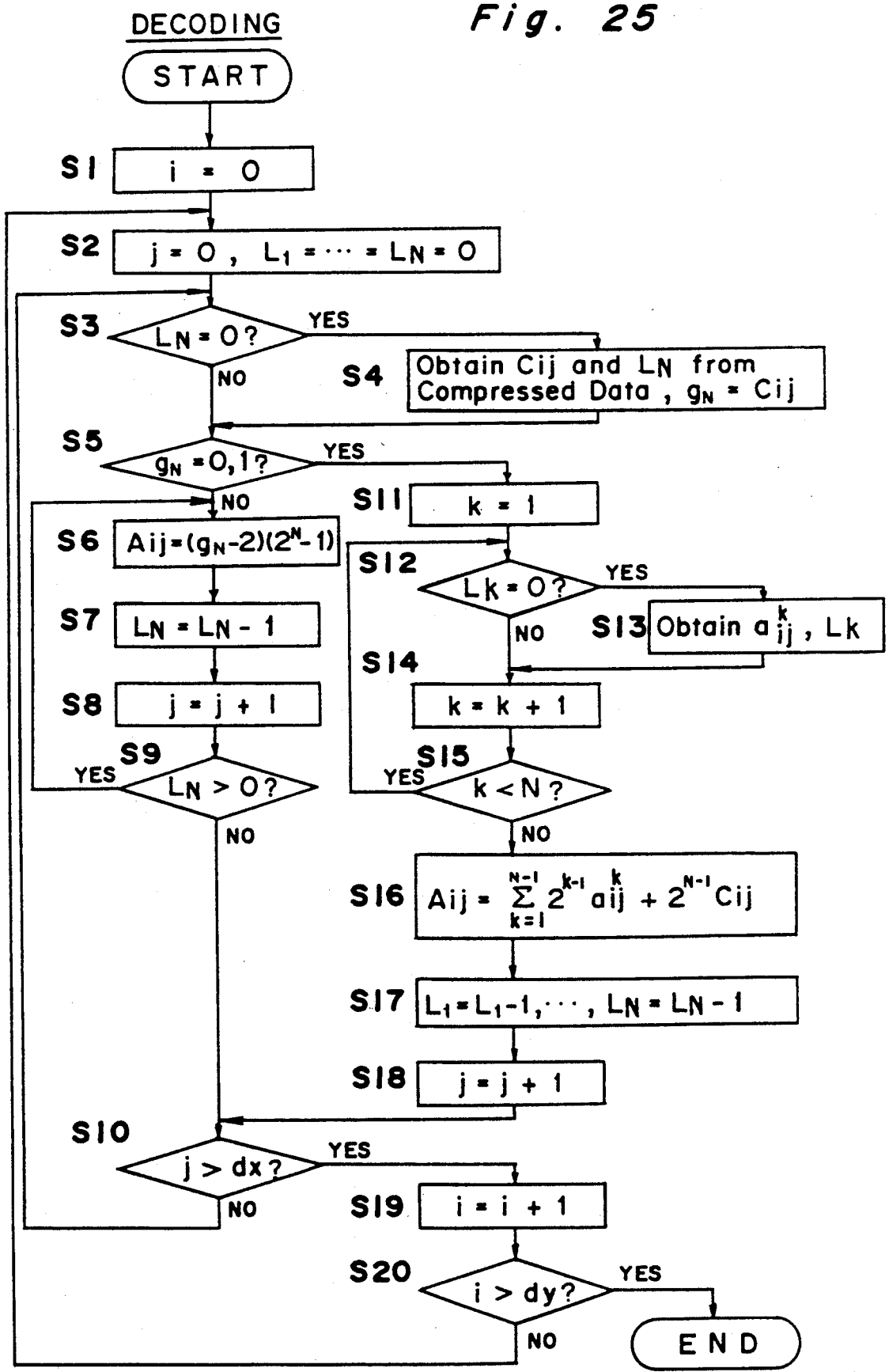
FIG. 25 is a flow chart showing an operation of the system of FIG. 20b for decoding the image data according to the MH coding method.

Referring to FIG. 25, a flow chart for effecting the decoding is shown. In the flow chart of FIG. 25, meaning of: (i,j), $A_{ij}$, $a_{ij}{}^k$, $b_{ij}$, $c_{ij}$, dx, dy and gn are the same as those used in the flow chart of FIG. 24. The description hereinbelow is directed to a case for decoding data shown in FIG. 22

In FIG. 25, at steps S1 and S2, the data are initialized. The program advances through step S3 to step S4 at which $g_N=c_{00}=3$, $L_N=3$ are reproduced. Then, at step S5, since $g_N=3$, the program goes to step S6 for detecting $A_{ij}=(g_{N-2})(2^N-1)=2^N-1$, thus reproducing $A_{00}=1$. Thereafter, steps S7 and S8 are carried out and at step S9, since $L_N=2$, the program returns to step S6. Then, steps S6, S7 and S8 are again carried out and, since $L_N=1$, the program returns again from step S9 to step S6. Then, steps S6, S7 and S8 are repeated, and at step S9, since $L_N=0$, the program advances to step S10. Since $j=3<dx=9$, the program returns to step S3. Since $L_N=0$, the program goes from step S3 to S4. Then, at step S4, compressed data $g_N=c_{03}=1$, $L_N=1$ are reproduced based on the compressed data, and at step S5, since $g_N=1$, the program advances to step S11 to set $k=1$. Then, since $L_1=0$, the program goes to step S13 at which $a_{03}{}^1=0$, $L_1=1$ are reproduced from the compressed data. Then, step S14 is effected. Since $k=2$, the program returns from step S15 to step S12. Since $L_2=0$, the program advances from step S12 to S13. In this manner, steps S14, S15, S12 and S13 are repeated to reproduce $a_{03}{}^2$, $L_2$; $a_{03}{}^3$, $L_3$; $\ldots$ ; $a_{03}{}^{N-2}=0$, $L_{N-2}=1$; $a_{03}{}^{N-1}=1$, $L_{N-1}=2$. Then, at step S14, k is incremented to $k=N$, and thus, the program advances step S15 to S16. At step S16, pixel value $A_{03}$ is reproduced by the following equation:

$$A_{03} = \sum_{k=1}^{N-1} 2^{k-1} \cdot a_{03}^k + 2^{N-1} c_{03}$$

Thereafter, steps S17 and S18 are effected and goes to step S10. Since $j=4<dx=9$, the program returns from step S10 to S3. At step S3, since $L_n=0$, the program goes to step S4 at which $g_N=c_{04}=0$, $L_N=1$ are reproduced based on the compressed data. Then, at step S5, since gn=0, the program goes to step S11, at which k=1 is set. Then, since $L_1=0$, the program goes from step S12 to S13, at which $a_{04}{}^1=1$ is reproduced based on the previous data $a_{03}{}^1=0$ and also $L_1=2$ is obtained based on the compressed data. Thereafter, steps S14, S15, S12, S13 are repeated to reproduce $a_{04}{}^2$, $L_2$; $a_{04}{}^3$, $L_3$; ... ; $a_{04}{}^{N-3}$, $L_{N-3}$; $a_{04}{}^{N-2}=1$, $L_{N-2}=1$. Then, after steps S14 and S15, the program goes to step S12 and further to step S14 since $L_{N-1}=1$. Then, at step S14, k is incremented to k=N. Thus, from step S15, the program advances to S16 to calculate the pixel value $A_{04}$ by the following equation:

$$A_{04} = \sum_{k=1}^{N-1} 2^{k-1} \cdot a_{04}^k + 2^{N-1} c_{04}$$

Thereafter, steps S17 and S18 are carried out, and then, step S10 is carried out. Since j=5, the program returns from step S10 to S3. Thereafter, similar operations are carried out to reproduce the original image.

In the above example, MH (Modified Huffman) coding and decoding is employed, but other coding method, such as MR (Modified Read) coding can be used, as explained below.

First, the image is divided in to first to Nth imaginary planes and a symbols 0, 1, 2, 3 or * is given to each pixel position, as in the same manner described above. The Nth imaginary plane is coded by MR coding such that during the scanning of a pixel, pixels in one line above are examined to find an identical valued pixel and the distance information (such as "five pixel positions to the right") with respect to the scanned pixel is coded. The other imaginary planes (first to (N−1)th imaginary planes) are coded by MH coding. MR coding system is appropriate when a pixel in one line and the identical valued pixel in the line above are close to each other. When these two identical valued pixels are far spaced, the MR coding may be switched to MH coding.

Another coding system is a predicted coding system in which two imaginary planes 1 and 2 are considered with the use of data $a_{ij}{}^k$ and $b_{ij}$. The first imaginary plane 1 is formed by data $a_{ij}{}^1$ and $b_{ij}$, and the second imaginary plane is formed by (i, j) as defined below:

$$\sum_{k=2}^{N-1} 2^{k-2} \cdot a_{ij}^k$$

and if the pixel can not be defined, that pixel position will remain blank. In this manner, the second imaginary plane 2 is formed by pixels having a pixel value between 0 and $2^{N-1}-1$ and blank pixels. The first imaginary plane 1 may be coded by run length coding as in the first example, or the by MR coding as in the second example. The second imaginary plane 2 may be coded by the predicted coding as explained below. First, predicted pixel value is set, and the imaginary plane is scanned, with the blank pixel being disregarded, so as to obtain a difference between the predicted pixel value and the detected pixel value. If the predicted pixel value is set to an appropriate value, the coding can be efficiently carried out. The predicted value can be determined in consideration of the pixel value change at the boundary portions of the characters. For example, assuming that the boundary portion between the background and character changes linearly, the predicted pixel value for the second imaginary plane 2 may be set equal to a value of the boundary pixel value expressed by a binary codes but the least significant bit is removed.

Figure 26A:
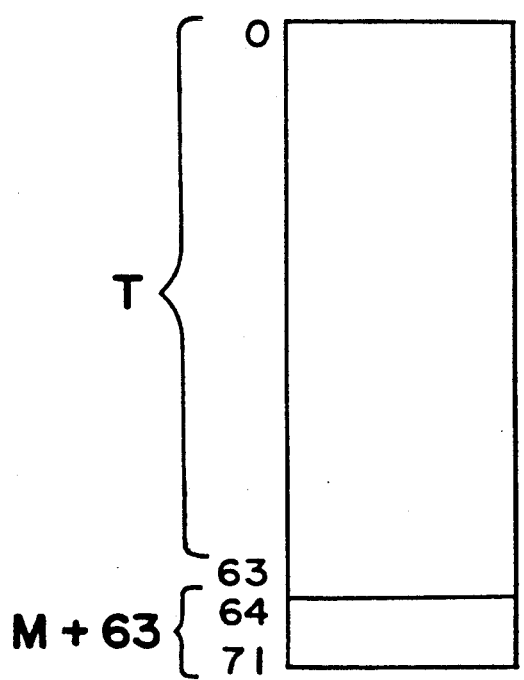
Figure 26B:
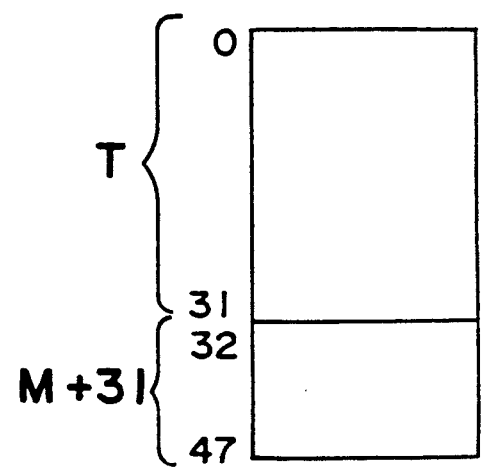

According to one example, 3 bit image data for 512×512 pixels coded and decoded according to the MH coding system. MH coding is effected by a histogram made by obtaining run lengths from 20 sample images. In this case, the runs L for the symbol 2 and 3 in the Nth imaginary plane are determined by modulo-64 numbering system (L=64M+T), in which M is a make up code and T is a termination code. Since other runs are relatively short, Huffman coded data may result in 32 bits or longer under the modulo-62 numbering system. Thus, for such short runs, M and T are determined according to modulo-32 numbering system (L=32M+T). In this case, an image with the horizontal pixel number of 512 is used. If an image with a greater pixel number is be used, more care should be taken. A structure of MH coding cable for the screen having 512 pixels aligned horizontally is shown in FIGS. 26a and 26b in which FIG. 26a shows a structure of MH coding table corresponding to runs for symbols "2" and "3" included in the Nth imaginary plane, and FIG. 26b shows a structure of MH coding table corresponding to runs for symbols other than "2" and "3".

The coding is carried out for 20 sample images and calculated is the following compression ratio $\alpha$:

$$\alpha = \frac{\text{Number of bits of compressed data}}{\text{Pixel number} \times N} \times 100 \ (\%)$$

An average of the compression ratio $\alpha$ obtained is 9.3%. On the other hands, an average of the compression ratio showed 11.7% for the same images according to the prior art method.

The present invention is applicable not only to the images with characters, but also to the images with diagrams of parts, in which an image with one part can be combined with an image with another part such that one part is fittingly inserted and matched into another part. In order to have the combined image look natural, the boundary portions of the combined parts and the background should have intermediate grey level pixels. To this end, pixel values for the parts has N bits. counted from the least significant bit, of data called region information representing the combining ratio of A and B. For example, if the ratio is such that:

$$A:B=2^N-1-C:C,$$

C represents the region information. When an image is formed with the collection of region information pieces, the pixel values would be "0" at the inside of the part, "$2^N-1$" at the background, and between "1" and "$2^N-2$" at the boundary portions of the part. Thus, the images of region information parts has the same feature as the images of characters.

Some of the above examples are explained in connection with $2^N$ grey level image, but p grey level image may be used instead. In this case, $2^N$ may be replaced with p, and N may be replaced with the least integer which is larger than $\log_2 p$.

Although the present invention has been fully described in connection with the preferred embodiments thereof with reference to the accompanying drawings, it is noted that various changes and modifications are apparent to those skilled in the art. Such changes and modifications are to be understood as included within the scope of the present invention as defined by the appended claims, unless they depart therefrom.

What is claimed is:

1. A text image data compression system for compressing image data divided into bit planes and including data text images disposed in a plain background image, said text image data compression system comprising:

means for producing grey level image data for a plurality of pixels aligned in two orthogonal directions, each pixel being expressed by N bits of data which represent values varying from a maximum value to a minimum value, in which the pixels with maximum value represent background, the pixels with minimum value represent characters, and the pixels with intermediate value represent boundary portions between the background and characters;

means for replacing said maximum value N bit data with a first symbol followed by N−1 bit common data and replacing said minimum value N bit data with a second symbol followed by N−1 bit common data, so that background portions are expressed by N bit symbols comprised of said first symbol and a plurality of common symbols, character portions are expressed by N bit symbols comprised of said second symbol and a plurality of said common symbols, and intermediate grey level portions are expressed by N bit symbols comprised of binary 1's and binary 0's;

means for making a symbol alignment wherein the N bit symbols lie in different bit planes, such that the most significant symbols of said N bit symbols are collected and are aligned from a first row of said N bit symbols to a bottom row of said N bit symbols, the second significant symbols of said N bit symbols are collected and are aligned from said first row to said bottom row, kth significant symbols of said N bit symbols are collected and are aligned from said first row to said bottom row, in which k is between three and N−1, and the least significant symbols of said N bit symbols are collected and are aligned from said first row to said bottom row, and that all of said common symbols are removed; and means for detecting run lengths in said symbol alignment after removal of said common symbols to produce run lengths of four different symbols.

2. A text image data compression system as claimed in claim 1, wherein said symbol alignment further includes a line symbol at the beginning of each of said rows and a plane symbol at the beginning of each collection of said most significant bit symbols.

3. A text image data compression system as claimed in claim 2, further comprising means for coding said symbol alignment.

4. A text image data compression system as claimed in claim 3, wherein said coding means carries out a modified Huffman coding.

5. A text image data compression system as claimed in claim 4, wherein said symbol alignment further has a first indicator at the beginning of each run of said most significant symbols for indicating one of said four different symbols.

6. A character image data compression system as claimed in claim 4, wherein said symbol alignment further has a second indicator at the beginning of each run of symbols other than said most significant symbols indicating one of two of said four different symbols.

7. A grey level reduction system for reducing text image data including text images disposed in a plain background image, said grey level reduction system comprising:

means for producing original image data for a plurality of pixels aligned in two orthogonal directions, each pixel having a pixel value expressed by N bit data which varies from a maximum value to a minimum value in which the pixels with maximum value represent white, the pixels with minimum value represent black, and the pixels with intermediate value represent grey;

means for producing a histogram of different pixel values to obtain a first pixel value at a first peak point adjacent said minimum value, and a second pixel value at a second peak point adjacent said maximum value, and also to obtain a threshold pixel value located between said first and second pixel values;

means for making a bi-level image by applying a white level value to all the pixels not smaller than said threshold, thereby producing white pixels and a black level value to all the pixels smaller than said threshold, thereby producing black pixels;

means for detecting a boundary portion of said bi-level image, said boundary portion being located where the white level value pixel portions and the black level value pixel portions meet; and means for replacing pixel values of said white and black pixels at said boundary portion with grey level values, thereby obtaining an image wherein said boundary portions change gradually from a black level to a white level.

8. A grey level reduction system as claimed in claim 7, further comprising:

means for quantizing said original image data to produce quantized image data such that the pixels with pixel values equal to or smaller than said first pixel value are assigned with a minimum pixel value, the pixels with pixel values equal to or greater than said second pixel value are assigned with a maximum pixel value, and the pixels with pixel values between said first and second pixel values are quantized with a predetermined quantization level, and wherein said replacing means replaces said pixel values of pixels at said boundary portion with grey level values obtained from said quantized image data.

* * * * *